United States Patent
Miedema

(10) Patent No.: US 10,440,128 B2
(45) Date of Patent: Oct. 8, 2019

(54) SYSTEMS AND METHODS FOR SELECTING EFFICIENT MESSAGING BETWEEN SERVICES

(71) Applicant: Ciena Corporation, Hanover, MD (US)

(72) Inventor: David Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 249 days.

(21) Appl. No.: 15/270,466

(22) Filed: Sep. 20, 2016

(65) Prior Publication Data

US 2018/0084063 A1    Mar. 22, 2018

(51) Int. Cl.
*H04L 29/08* (2006.01)

(52) U.S. Cl.
CPC .............. *H04L 67/16* (2013.01); *H04L 67/10* (2013.01); *H04L 67/32* (2013.01)

(58) Field of Classification Search
CPC .......... H04L 67/16; H04L 67/32; H04L 67/10
See application file for complete search history.

(56) References Cited

U.S. PATENT DOCUMENTS

| | | | | |
|---|---|---|---|---|
| 2004/0054690 A1* | 3/2004 | Hillerbrand | ............ | G06Q 10/06 |
| 2004/0220946 A1* | 11/2004 | Krishnaprasad | .... | G06F 17/3092 |
| 2008/0133587 A1* | 6/2008 | Ganugapati | ....... | H04L 29/12141 |
| 2010/0083277 A1* | 4/2010 | Malladi | .................... | G06F 9/541 719/313 |
| 2011/0138168 A1* | 6/2011 | Peterson | ............... | G06F 9/4493 713/150 |
| 2013/0117326 A1* | 5/2013 | De Smet | ............... | G06F 9/4488 707/798 |
| 2017/0272360 A1* | 9/2017 | Dunn | ..................... | H04L 69/22 |

* cited by examiner

*Primary Examiner* — Michael A Keller
*Assistant Examiner* — Jsing Forng Lin
(74) *Attorney, Agent, or Firm* — Clements Bernard Walker PLLC; Christopher L. Bernard; Lawrence A. Baratta, Jr.

(57) ABSTRACT

Systems and methods for selecting efficient messaging to a service include operating the service in a one of a Microservices Architecture (MSA) and a Service-Oriented Architecture (SOA); providing messaging protocols and serialization formats supported by the service for a second service to determine the efficient messaging to the service; and communicating with the second service via a selected messaging protocol and a selected serialization format based on the providing. Each of the service and the second service is a self-contained unit of functionality that is combined with other services to provide functionality of a large software application.

19 Claims, 5 Drawing Sheets

SYSTEMS AND METHODS FOR SELECTING EFFICIENT MESSAGING BETWEEN SERVICES

FIELD OF THE DISCLOSURE

The present disclosure generally relates to computer systems and methods. More particularly, the present disclosure relates to systems and methods for selecting efficient messaging between services.

BACKGROUND OF THE DISCLOSURE

A Service-Oriented Architecture (SOA) is an approach in computer software design in which application components provide services to other components via a communications protocol such as over a network. The principles of service-orientation are independent of any vendor, product, or technology. A service is a self-contained unit of functionality and services can be combined to provide the functionality of a large software application. Every computer can run any number of services, and each service is built in a way that ensures that the service can exchange information with any other service in the network without human interaction and without the need to make changes to the underlying program itself. Microservices are a variant of SOA used to build distributed software systems. Similar to SOA, services in a Microservice Architecture (MSA) are processes that communicate with each other over the network in order to fulfill an objective, and these services use technology-agnostic protocols. In a Microservice Architecture, services should be small, and the protocols should be lightweight. The benefit of distributing different responsibilities of the system into different smaller services is that it enhances the cohesion and decreases the coupling. This makes it much easier to change and add functions and qualities to the system anytime.

Conventionally, when services are designed to communicate, they decide on protocols that allow them to communicate most efficiently at the design stage. If the worst case deployment forces them to use a more inefficient protocol than the best case deployment, this is not a design consideration. The design of the architecture must support the worst case, so that is the main focus and little effort is made in optimizing for the best case. If multiple techniques of messaging can be used to address best case solutions, this again is done by design and specifically targeted to the client/server interactions. This normally forces messaging-specific code to be duplicated over the multiple mechanisms and can be a problem for maintenance. It also does not provide real measurement data to allow services to select the best protocol at runtime.

If multiple protocols are supported by a service, conventionally there is no way to known in a given deployment which protocols are supported, which are compatible, and which are the best performers. This must all be analyzed manually. Since manual analysis is time-consuming and may happen frequently, this normally does not happen, and designs fall back to support the worst case protocol.

BRIEF SUMMARY OF THE DISCLOSURE

In an exemplary embodiment, a computer-implemented method for selecting efficient messaging to a service operating the service in a one of a Microservices Architecture (MSA) and a Service-Oriented Architecture (SOA); providing messaging protocols and serialization formats supported by the service for a second service to determine the efficient messaging to the service; and communicating with the second service via a selected messaging protocol and a selected serialization format based on the providing. Each of the service and the second service can be a self-contained unit of functionality that is combined with other services to provide functionality of a large software application. The providing can be via a directory service which advertises the messaging protocols and the serialization formats supported by the service, and wherein the second service can select the selected messaging protocol and the selected serialization format which requires a minimum amount of processing. The providing can via a directory service which advertises the messaging protocols and the serialization formats supported by the service, and wherein the directory service can include an identification of a processor, a process, and thread the service is running on. The second service can select the selected messaging protocol and the selected serialization format based on one or more of architecture endianness, processor word width, and bit/byte packing rules.

The service and the second service can exist as threads in a same process, and wherein the communicating can be via function based calls using shared memory thereby avoiding serialization and marshaling. The service and the second service can exist as one of separate processes and on separate processors, and wherein the communicating is based on endianness and word width. The providing can include providing data over two or more serialization formats from the service to the second service to determine compatibility in parallel with the second service selecting the efficient messaging based on the compatibility. The providing can include providing data from the second service to the service via a first serialization format and the service providing the data back to the second service via a second serialization format to determine compatibility with the second service selecting the efficient messaging based on the compatibility. The providing can include providing data from the service to the second service via a plurality of serialization formats and the second service determining compatibility based on validity of the data and relative timing.

In another exemplary embodiment, an apparatus adapted to operate a service and to provide selection of efficient messaging to the service includes one or more processors; and memory storing instructions that, when executed, cause the one or more processors to operate the service in a one of a Microservices Architecture (MSA) and a Service-Oriented Architecture (SOA), provide messaging protocols and serialization formats supported by the service for a second service to determine the efficient messaging to the service, and communicate with the second service via a selected messaging protocol and a selected serialization format based on the providing. Each of the service and the second service can be a self-contained unit of functionality that is combined with other services to provide functionality of a large software application. The second service can select the selected messaging protocol and the selected serialization format based on one or more of architecture endianness, processor word width, and bit/byte packing rules. The service and the second service can exist as threads in a same process, and wherein communication can be via function based calls using shared memory thereby avoiding serialization and marshaling. The service and the second service can exist as one of separate processes and on separate processors, and wherein the communicating can be based on endianness and word width.

To provide the serialization formats, the memory storing instructions that, when executed, can cause the one or more processors to provide data over two or more serialization formats from the service to the second service to determine compatibility in parallel with the second service selecting the efficient messaging based on the compatibility. To provide the serialization formats, the memory storing instructions that, when executed, can cause the one or more processors to receive data from the second service to the service via a first serialization format; and provide the data back to the second service via a second serialization format to determine compatibility with the second service selecting the efficient messaging based on the compatibility. To provide the serialization formats, the memory storing instructions that, when executed, can cause the one or more processors to provide data from the service to the second service via a plurality of serialization formats and the second service determining compatibility based on validity of the data and relative timing.

In a further exemplary embodiment, a system of a plurality of services which select efficient messaging between one another includes a plurality of services, executed on one or more servers, in a one of a Microservices Architecture (MSA) and a Service-Oriented Architecture (SOA); and a directory server communicatively coupled to the one or more servers and operating a directory service adapted to advertise messaging protocols and serialization formats supported by a first service for a second service to determine the efficient messaging to the first service, wherein the second service is configured to communicate via a selected messaging protocol and a selected serialization format based on advertisements from the directory service. Each of the plurality of services can be a self-contained unit of functionality that is combined with other services to provide functionality of a large software application.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to systems and methods for selecting efficient messaging between services. The systems and methods allow services to remain agnostic of the protocols being used to communicate and to automatically select the best communication protocol for the given deployment. With the systems and methods, microservices or services automatically configured and select the most efficient messaging protocol and serialization format based on a list of supported candidates, and the compatibilities identified between the client and the server. In some cases, full serialization is not required between devices, especially if the services are running on the same architecture, processor, or in the same process. More efficient protocols can be selected which can avoid some of the more expensive parts of serialization and deserialization.

If location and platform independent services are communicating generically and they are not aware of the architectural characteristics of the other service, they assume the worst case serialization and messaging format. The systems and methods allow a directory service to advertise the protocols supported by both ends and can provide other information that can help a service make a decision on the most efficient protocol. This allows deployments in which services are deployed closely or even in the same thread to bypass much of the Serialization-Deserialization (SERDES) process for efficiency.

The systems and methods allow services to advertise the available encoding mechanisms that are supported such that other services can connect in the most efficient way possible. The systems and methods summarize the compatibility of services with respect to data serialization, to allow a location independent service to select an encoding mechanism that requires the least processing. The systems and methods provide automatic selection of a compatible serialization mechanism between two services, such as two location independent services.

Exemplary System

Figure 1:
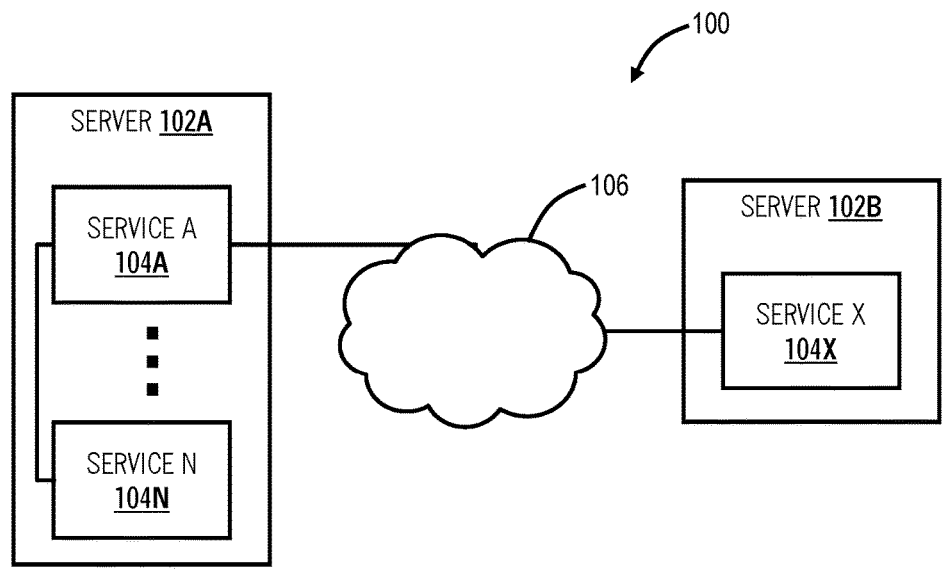
FIG. 1 is a network diagram of a services system with two exemplary servers executing exemplary services.

Referring to FIG. 1, in an exemplary embodiment, a network diagram illustrates a services system 100 with two exemplary servers 102A, 102B executing exemplary services 104A, 104N, 104X. In this example, the server 102A executes the services 104A, 104N, and the server 102B executes the service 104X. The servers 102A, 102B are communicatively coupled to one another over a network 106. The network 106 can be a Local Area Network (LAN), a wireless LAN (WLAN), a Wide Area Network (WAN), a data center network, the Internet, any other type of network, and a combination thereof. The servers 102A, 102B can be physical servers in racks, Virtual Machines (VM), blades, or the like.

The services 104A, 104N, 104X can be microservices or any other type of service in an SOA. The services 104A, 104N, 104X are each a self-contained unit of functionality and each can communicate with one another. The services 104A, 104N, 104X can be organized around their capabilities, e.g., a User Interface (UI) front end, billing, etc. The services 104A, 104N, 104X can be implemented using different programming languages, databases, hardware and software environment, etc. The services 104A, 104N, 104X can be viewed as a producer-consumer where one service makes requests from another, using communication techniques. As described herein, the services 104A, 104N, 104X typically are hard coded for a communication technique, and there is no current mechanism for negotiation to take advantage of better available communication techniques. For example, the services 104A, 104N are operating on the same hardware, i.e., the server 102A, and it may be advantageous for these services 104A, 104N to use different communication techniques that may be more efficient (e.g., passing a pointer to memory is more efficient than messaging using a defined protocol).

A common example of a service 104 is a mapping function, such as Google maps, Apple maps, etc. For example, assume the service 104X is a mapping function, and the service 104A is some other service which uses the mapping function. The service 104X for the mapping function has defined messaging interfaces which, as described herein, assume the worst case, i.e., communication over the network 106. For example, the messaging interfaces can be Hypertext Transfer Protocol (HTTP). However, assume the service 104X has other messaging interfaces which are more efficient than HTTP. The systems and methods describe various techniques to allow a negotiation and dynamic selection of the messaging interfaces as appropriate at runtime. In another example, assume the services 104A, 104N all operate on the server 102A to form a distributed software system, despite being on common hardware. Since the services 104A, 104N are on common hardware; again it would be advantageous for these services 104A, 104N to negotiate for the dynamic selection of the messaging interfaces as appropriate at runtime.

Exemplary Server

Figure 2:
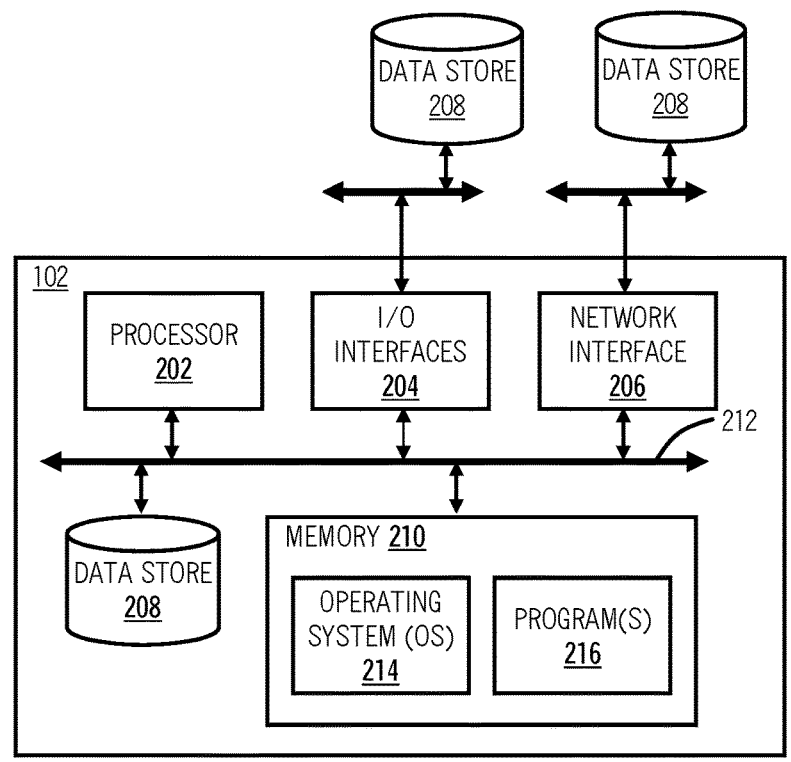
FIG. 2 is a block diagram of an exemplary implementation of the server in the network of FIG. 1.

Referring to FIG. 2, in an exemplary embodiment, a block diagram illustrates an exemplary implementation of the server 102. The server 102 can be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 102 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the server 102, a semiconductor-based microprocessor (in the form of a microchip or chip set), or generally any device for executing software instructions. When the server 102 is in operation, the processor 202 is configured to execute software stored within the memory 210, to communicate data to and from the memory 210, and to generally control operations of the server 102 pursuant to the software instructions. The I/O interfaces 204 can be used to receive user input from and/or for providing system output to one or more devices or components. User input can be provided via, for example, a keyboard, touchpad, and/or a mouse. System output can be provided via a display device and a printer (not shown). I/O interfaces 204 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 can be used to enable the server 102 to communicate on a network, such as the network 106. The network interface 206 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 can include address, control, and/or data connections to enable appropriate communications on the network. A data store 208 can be used to store data. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the server 102 such as, for example, an internal hard drive connected to the local interface 212 in the server 102. Additionally, in another embodiment, the data store 208 can be located external to the server 102 such as, for example, an external hard drive connected to the I/O interfaces 304 (e.g., SCSI or USB connection). In a further embodiment, the data store 208 can be connected to the server 102 through a network, such as, for example, a network attached file server.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 can incorporate electronic, magnetic, optical, and/or other types of storage media. Note that the memory 210 can have a distributed architecture, where various components are situated remotely from one another, but can be accessed by the processor 202. The software in memory 210 can include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. The services 104 can be instructions in the memory 210 and/or the data store 208 which are executed by the processor 202.

Finding Services and Discovering the Most Efficient Communication Interface

Again, in SOA or in a Microservice Architecture, an objective is to develop services that are processor and location independent. This allows the service 104 to scale properly and provides architectural flexibility. This is normally done by implementing message-based interfaces between the services. The messages are normally marshaled to allow for differences in processor and architecture between the sender and the receiver. The use of message-based protocols in a service architecture can impact latency and processor capacity since data marshaling, and messaging can be an intensive process. Because of the location independence, the sender and the receiver typically must assume the worst case even if they reside on the same processor, or even in the same shared memory space, where more efficient interfaces may be possible.

There are a variety of messaging interfaces that offer differing levels of efficiency in a services system 100 including, for example:
  Synchronous (blocking) function calls between functions
  Asynchronous (non-blocking) function calls between functions Message based between threads in the same process (shared memory)

Message based between processes in the same processor

Message based between processors sharing the same architecture

Message based between processors with different architectures

The different types of architectures cause different types of marshaling requirements when sending a message. Marshaling is the process of transforming the memory representation of an object to a data format suitable for storage or transmission, and it is used when data must be communicated between services 104. Marshaling is similar to serialization and is used to communicate to remote objects with an object, in this case, a serialized object. It simplifies complex communication, using custom/complex objects to communicate instead of primitives. The opposite, or reverse, of marshaling is called unmarshaling (or demarshaling, similar to deserialization).

Exemplary marshaling requirements can include Endianness (order of transmission of data), Processor word size, Compiler byte alignment and packing algorithms, Differences in serialization between languages, and the like.

In the worst case, this would drive fully marshaled and serialized messages to be sent for each interface invocation between services 104. There are a variety of techniques for serializing as well, and these have different levels of efficiency. It may be that a caller supports some techniques of serialization where the called interface does not support the complete set of deserialization.

The systems and methods include discovering the services 104 and negotiating the most efficient mechanisms for invoking interfaces of a service 104 and responding to interface invocations. It is desirable that the actual technique of invocation that is selected can be shielded from the calling application. This allows the interface layer of the client and server to be abstracted, since, in many cases, the serialization and deserialization are best performed as part of the architecture itself, and not embedded in the service 104.

Location and Capability Identification

The systems and methods can use a directory service which maps the names of network resources to their respective network addresses. A directory server is a server which provides directory service, e.g., an instance of the server 102 connected to the network 106. Each resource on the network is considered an object on the directory server. Information about a particular resource is stored as attributes of that object. In some directory services, information within objects can be made secure so that only users with the available permissions can access it. In an exemplary embodiment, a directory server can be used to execute a directory service for the services 104.

As part of a directory service, which normally allows for services to advertise themselves in an architecture, and provide a universal handle for reference, the systems and methods provide a universal location identifier. This location identifier can be based on a unique name or identifier of the processor, process, and thread the service 104 is running on. In addition to this location identifier, the directory service can also include capability identification for the architecture. This can include information on architecture endianness, processor word width, and bit/byte packing rules. This location and capability information can be used by an architectural messaging layer to determine what levels of marshaling and serialization are needed. It will also be used to determine what type of interface can be used between the services 104.

For example, in cases where the services 104 exist in threads in the same process, a function based call using shared memory may be invoked, and all serialization and marshaling can be avoided. In cases where the services 104 exist on separate processes or processors, a message based interface must be used. However, if the two services 104 are deployed on machines that share the same endianness and word width, perhaps a more efficient serialization technique may be selected for the interface.

Supported Serialization Protocols

In addition to the architectural descriptions, where processor location and capabilities are agreed upon, the serialization mechanisms to be used may also be negotiated. Some examples of different serialization mechanisms are, without limitation: JavaScript Object Notation (JSON), Extensible Markup Language (XML), Protocol Buffers (Protobuf), FlatBuffers, Thrift, YAML, External Data Representation (XDR), Flat memory space, D-Bus, Binary JSON (BSON), and the like.

JSON is an open-standard format that uses human-readable text to transmit data objects in attribute-value pairs. XML is a markup language that defines a set of rules for encoding documents in a format that is both human-readable and machine-readable. Protobuf is from Google and is a language-neutral, platform-neutral, extensible mechanism for serializing structured data similar to XML, but smaller, faster, and simpler. FlatBuffers is an efficient cross-platform serialization library for C++, C#, C, Go, Java, JavaScript, PHP, and Python. It was originally created at Google for game development and other performance-critical applications. Apache's Thrift software framework, for scalable cross-language services development, combines a software stack with a code generation engine to build services that work efficiently and seamlessly between C++, Java, Python, PHP, Ruby, Erlang, Perl, Haskell, C#, Cocoa, JavaScript, Node.js, Smalltalk, OCaml and Delphi and other languages.

YAML is a human-friendly data serialization standard for all programming languages. XDR is a standard data serialization format, for uses such as computer network protocol. Flat memory space or flat memory model refers to how memory is addressed by services 104 running on the same machine. D-Bus is an inter-process communication (IPC) and remote procedure call (RPC) mechanism that allows communication between services 104 concurrently running on the same machine. BSON is computer data interchange format used mainly as a data storage and network transfer format in the MongoDB database.

Each serialization mechanism has different characteristics which may make them more usable in different interfaces. Some relevant characteristics are binary, supports Zero-copy, supports metadata inclusion, etc. If two services 104 share common serialization formats that are also supported by the architectural interface efficiencies negotiated by the architectural comparison, the most efficient serialization should be selected.

Discovery and Negotiation

The supported serialization protocols and formats, as well as the details of the capabilities are advertised by the directory service. In an exemplary embodiment, this can be encoded as a series of flags that indicate the capabilities and supported protocols, and each service 104 would need to interpret the information and match capabilities, processor architectures, endianness, word width, etc. In another exemplary embodiment, a set of data can be devised that, through serialization on that architecture, reveals the relevant features of the processor architecture, bit alignment, packing rules, endianness, and serialization formats for confirmation.

For example, if a protocol supports a binary serializer, this may be the most efficient protocol since it requires less marshaling, but it can only be supported between two services 104 that share a common architecture. Rather than find a way to explain that architecture via flags and capabilities, it may be easier to simply have a structure that the serializer can encode and send through two channels. One channel is the protocol's serialization, and the other channel is an agreed upon (possibly inefficient) mechanism that fully marshals all data and is architecture and implementation independent.

If the service 104 that wishes to connect can deserialize the content of the more efficiently encoded message and arrive at the correct answer, then that more efficient protocol can be selected. For efficiency sake, this check can only be performed once, and the directory service can store compatibility information between two endpoints to allow future users to benefit from the handshaking operation.

The following provides an example structure which tries and captures as many marshaling use cases as possible.

```
Structure
{
    String[ ]        dynamicLengthStringTest
    String[20]       fixedLengthStringTest
    Ip_addr          ipAddressTest
    Boolean          BooleanTest
    Integer          integerTest
    Float            floatingPointTest
    Structure        structureTest
    {
        Enumeration     enumerationTest
        Bitfield        bitfieldTest
    }
    List listTest[keyTest]
    {
        Uint8           keyTest
        fixedPoint      fixedPointTest
    }
}
```

This sample schema can have a sample instance as follows
{abc,def,1.2.3.4,true,12345,123.45,{red,[red,blue]},[{1, 123.4},{2,567.8}]}
This can be serialized to JSON as follows:

```
{
    "dynamicLengthStringTest":   "abc",
    "fixedLengthStringTest":     "def",
    "ipAddressTest":             "1.2.3.4",
    "BooleanTest":               true,
    "integerTest":               12345,
    "floatingPointTest":         "123.45",
    "structureTest":
    {
        "enumerationTest":       "red",
        "bitfieldTest":          ["red","blue"]
    },
    "listTest":
    [
        {
            "keyTest":           1,
            "fixedPointTest":    "123.4"
        },
        {
            "keyTest":           2,
            "fixedPointTest":    "567.8"
        }
    ]
}
```

Or in XML, as

```
<Structure>
    <dynamicLengthStringTest>abc</dynamicLengthStringTest>
    <fixedLengthStringTest>def</fixedLengthStringTest>
    <ipAddressTest>1.2.3.4</ipAddressTest>
    <BooleanTest>true</BooleanTest>
    <integerTest>12345</integerTest>
    <floatingPointTest>123.45</floatingPointTest>
    <structureTest>
        <enumerationTest>red</enumerationTest>
        <bitfieldTest>red<bitfieldTest>
        <bitfieldTest>blue<bitfieldTest>
    </structureTest>
    <listTest keyTest="1">
            <fixedPointTest>123.4</fixedPointTest>
    </listTest>
    <listTest keyTest="2">
            <fixedPointTest>567.8</fixedPointTest>
    </listTest>
</Structure>
```

The above examples show platform and architecture independent serialization. Indeed, that was a key feature in their design. If the structure and instance above were converted to C, it may look something like this:

```
typedef enum
{
    Red       = 1;
    Blue      = 2;
    Yellow    = 3;
} ColorsEnum;
typedef struct
{
    uint8        keyTest;
    uint64       fixedPointTest;
    uint8        fixedPointTest_decimals;
} listTest;
typedef struct
{
    ColorsEnum           enumerationTest
    boolean              bitfieldTest_red:1;
    boolean              bitfieldTest_blue:1;
    boolean              bitfieldTest_yellow:1;
} structureTest;
typedef struct
{
    char         *dynamicLengthStringTest;
    char[20]     fixedLengthStringTest;
    ip_addr      ipAddressTest;
    bool         BooleanTest;
    int          integerTest;
    float        floatingPointTest
    structureTest   structTest;
    listTest     *listTest_List
    uint8        listTest_Size
} structure
```

When compiled, the memory layout of this code will be dependent on the compiler, the target architecture, and the target word-width. It will also depend on the way the structure schema has been mapped to the c-structures.

Negotiation Process

Figure 3:
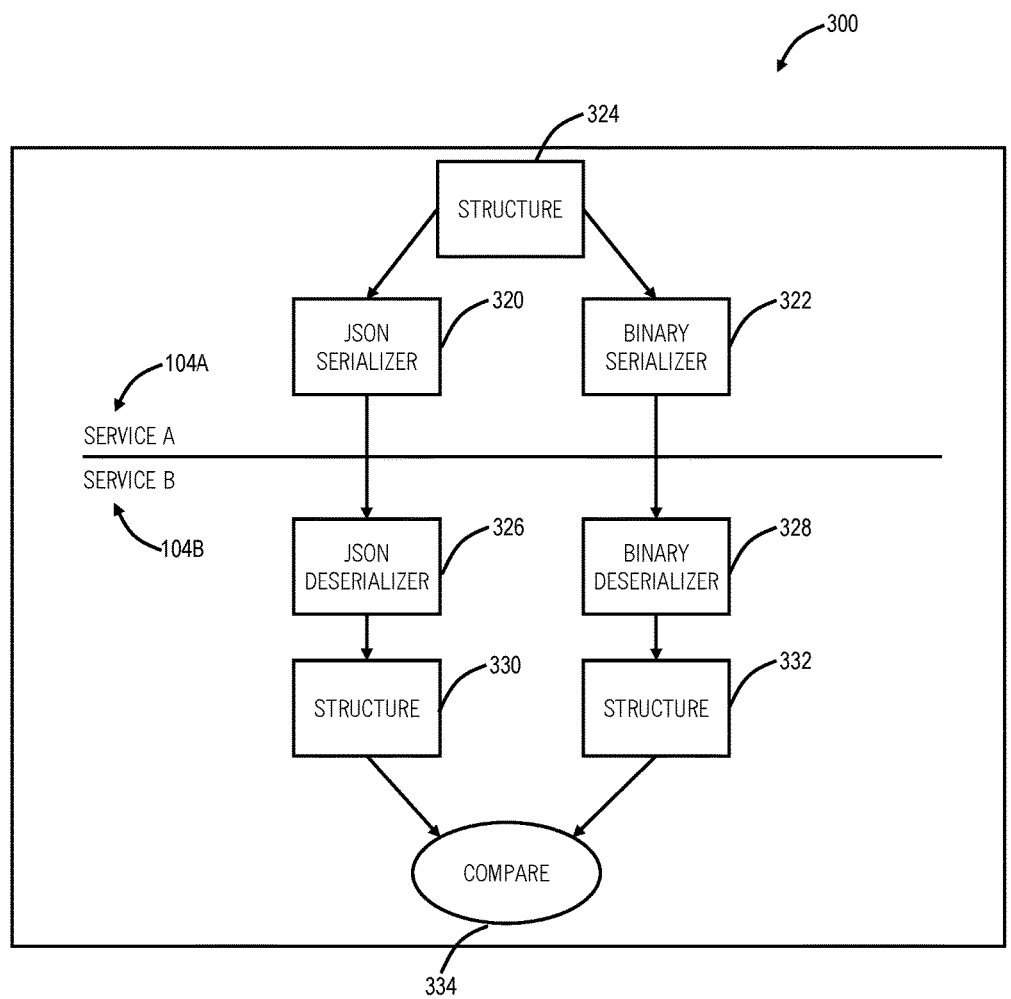
FIG. 3 is a block diagram of services performing a negotiation process to determine serialization formats.
Figure 4:
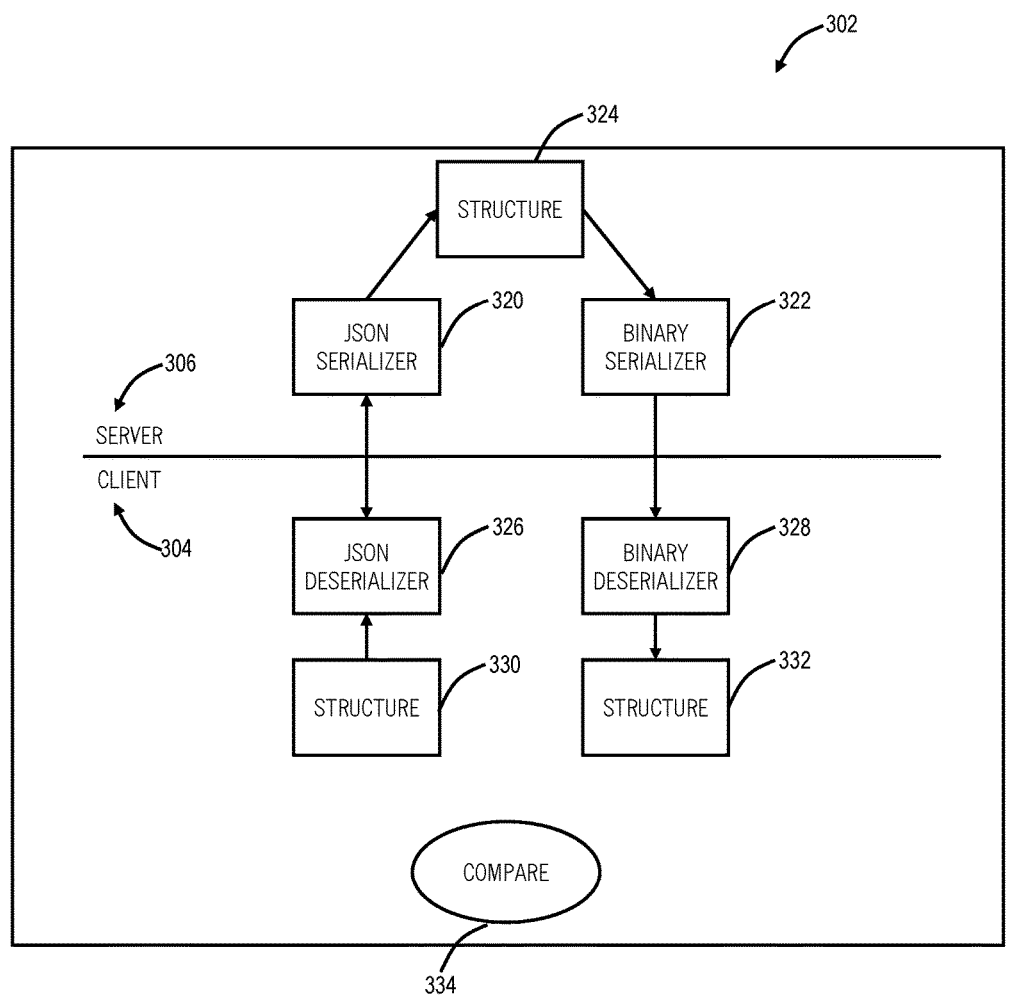
FIG. 4 is a block diagram of a negotiation process between a client and a server to determine serialization formats.
Figure 5:
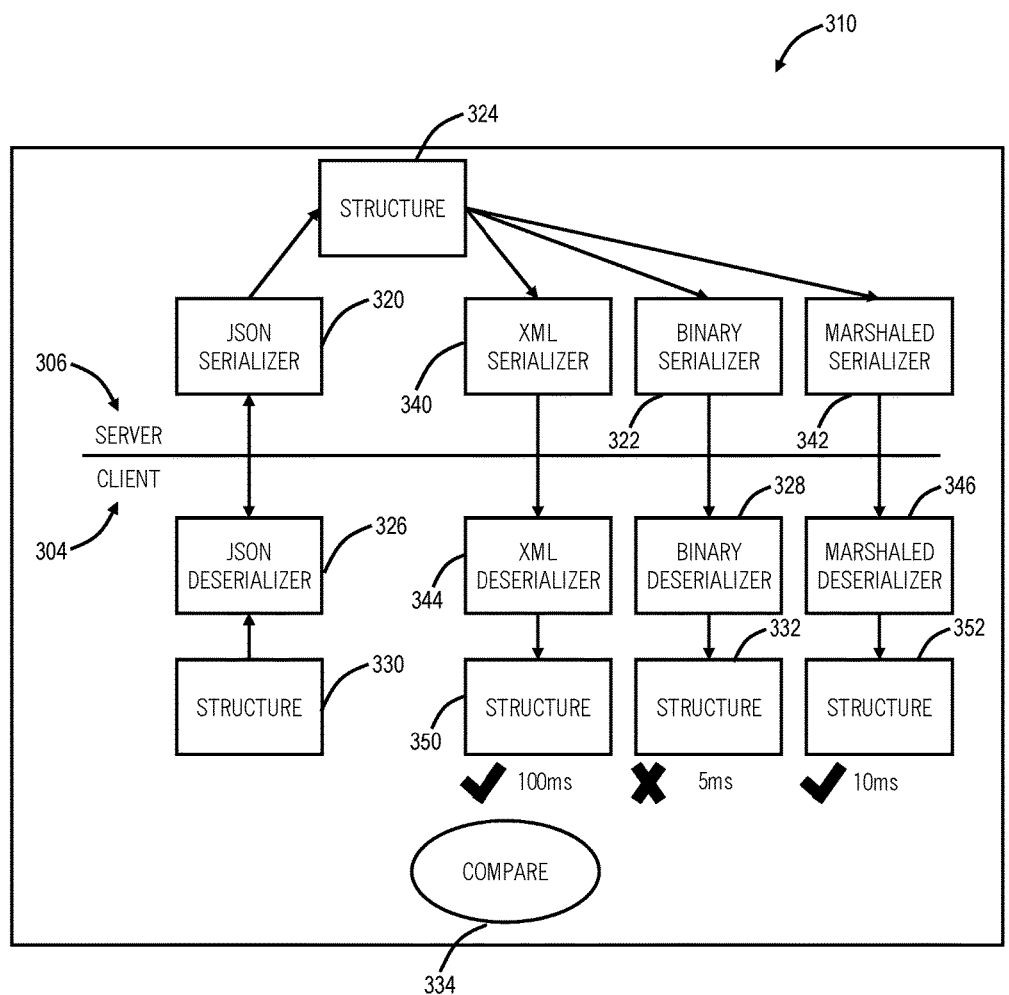
FIG. 5 is a block diagram of another negotiation process between the client 304 and the server testing multiple serialization formats in parallel to determine serialization formats.

Referring to FIG. 3, in an exemplary embodiment, a block diagram illustrates services 104A, 104B performing a negotiation process 300 to determine serialization formats. Referring to FIG. 4, in an exemplary embodiment, a block diagram illustrates a negotiation process 302 between a client 304 and a server 306 to determine serialization formats. Referring to FIG. 5, in another exemplary embodiment, a block diagram illustrates a negotiation process 310 between the client 304 and the server 306 testing multiple serialization formats in parallel to determine serialization formats.

It is advantageous to be able to use the in-memory representation directly without going through full serialization to a non-binary format and back again, but before it is determined if it is possible, it must be determined if the structure mappings and memory layouts on the source and destination are compatible. In FIG. 3, one approach with the negotiation process 300 is to serialize a test structure using both types of serializers of serialization formats supported by the services 104A, 104B and see if they arrive at a compatible result.

For example, in FIG. 3, the service 104A has a JSON serializer 320 and a binary serializer 322. For the negotiation process 300, the service 104A can generate a test structure 324, process it with the JSON serializer 320 and the binary serializer 322, and provide the serialized test structure to the service 104B. The service 104B can include a JSON deserializer 326 and a binary deserializer 328 which receive the corresponding outputs from the JSON serializer 320 and the binary serializer 322. Corresponding outputs 330, 332 from the JSON deserializer 326 and the binary deserializer 328 can be compared 334 by the service 104B.

If the comparison 334 is successful, it is an indication that the more efficient serialization format will work for communicating between these two services 104A, 104B. This can be marked in the directory service for any other service 104 that matches the location fingerprint. Specifically, the negotiation process 300 includes providing data over two or more serialization formats from the service 104A to the service 104B to determine compatibility. This is a parallel approach.

Alternative approaches can also be taken where serialized versions of the test structure 324 can be stored in the directory service and provided to a service 104 which is attempting to connect. Additional data can be provided which can indicate the relative time taken for the serializer to serialize and deserialize the data. This can be used to help a service 104 to generically select the most efficient serialization mechanism that is supported by the remote service 104.

In FIG. 4, for the negotiation process 302, it is also possible to do the check without a pre-determined test structure. If the client 304 which is connecting to the server 306 provides its own structure to be tested and specifies two serialization formats to test against, e.g., JSON and binary, the server 306 can accept the data object over one format, deserialize, reserialize the object using the second serialization formats, and send the result back to the client 304. The client 304 can then compare between the sent and echoed structure to determine if the tested serialization formats are compatible. The negotiation process 302 is a serial approach where the client 304 sends data serialized in one format to the server 306, and the server 306 sends it back in another format to the client 304. The client 304 can determine compatibility by comparing the originally formatted data to the deserialized data in the another format.

In FIG. 5, for the negotiation process 310, multiple serialization formats can be tested in parallel and evaluated for relative timing differences to allow selection of the most efficient mechanism possible for serialization. Note that test structures can also be pre-evaluated by the server 306 for each mechanism and stored in the directory service to allow a client 304 to more efficiently evaluate the serialized test structures for correctness and to rank the compatible mechanisms based on timing. For example, in FIG. 5, the server 306 can include the JSON serializer 320, the binary serializer 322, an XML serializer 340, and a marshaled serialized 342. The client 304 can include the JSON deserializer 326, the binary deserializer 328, an XML deserializer 344, and a marshaled deserializer 346. Structures 330, 332, 350, 352 output from the deserializers 326, 328, 344, 346 can be compared to check relative timing, e.g., in milliseconds, and validity.

Computer-Implemented Process for Selecting Efficient Messaging

Figure 6:
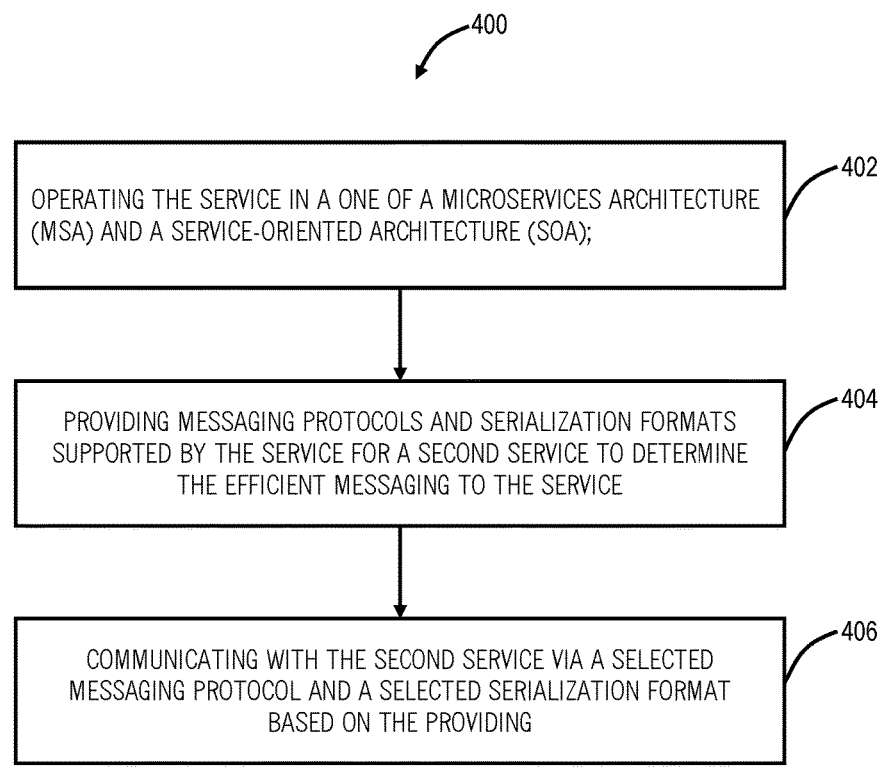
FIG. 6 is a flowchart of a computer-implemented process for selecting efficient messaging to a service.

Referring to FIG. 6, in an exemplary embodiment, a flowchart illustrates a computer-implemented process 400 for selecting efficient messaging to a service. The computer-implemented process 400 includes operating the service in a one of a Microservices Architecture (MSA) and a Service-Oriented Architecture (SOA) (step 402); providing messaging protocols and serialization formats supported by the service for a second service to determine the efficient messaging to the service (step 404); and communicating with the second service via a selected messaging protocol and a selected serialization format based on the providing (step 406). Each of the service and the second service is a self-contained unit of functionality that is combined with other services to provide the functionality of a large software application.

The providing step 404 can be via a directory service which advertises the messaging protocols and the serialization formats supported by the service, and wherein the second service selects the selected messaging protocol and the selected serialization format which requires a minimum amount of processing. The providing step 404 can be via a directory service which advertises the messaging protocols and the serialization formats supported by the service, and wherein the directory service can include an identification of a processor, a process, and thread the service is running on. The second service can select the selected messaging protocol and the selected serialization format based on one or more of architecture endianness, processor word width, and bit/byte packing rules.

The service and the second service can exist as threads in the same process, and wherein the communicating step 406 can be via function based calls using shared memory thereby avoiding serialization and marshaling. The service and the second service can exist as one of separate processes and on separate processors, and wherein the communicating step 406 can be based on endianness and word width.

The providing step 404 can include providing data over two or more serialization formats from the service to the second service to determine compatibility in parallel with the second service selecting the efficient messaging based on the compatibility. The providing step 404 can include providing data from the second service to the service via a first serialization format and the service providing the data back to the second service via a second serialization format to determine compatibility with the second service selecting the efficient messaging based on the compatibility. The providing step 404 can include providing data from the service to the second service via a plurality of serialization formats and the second service determining compatibility based on the validity of the data and relative timing.

In another exemplary embodiment, an apparatus adapted to operate a service and to provide selection of efficient messaging to the service includes one or more processors; and memory storing instructions that, when executed, cause the one or more processors to operate the service in a one of a Microservices Architecture (MSA) and a Service-Oriented Architecture (SOA), provide messaging protocols and serialization formats supported by the service for a second service to determine the efficient messaging to the service, and communicate with the second service via a selected messaging protocol and a selected serialization format based on the providing.

In a further exemplary embodiment, a system of a plurality of services which select efficient messaging between one another includes a plurality of services, executed on one or more servers, in a one of a Microservices Architecture (MSA) and a Service-Oriented Architecture (SOA); and a directory server communicatively coupled to the one or more servers and operating a directory service adapted to advertise messaging protocols and serialization formats supported by a first service for a second service to determine the efficient messaging to the first service, wherein the second service is configured to communicate via a selected messaging protocol and a selected serialization format based on advertisements from the directory service.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method for selecting efficient messaging between a service and a second service, the computer-implemented method comprising:
    operating the service in a one of a Microservices Architecture (MSA) and a Service-Oriented Architecture (SOA);
    providing a plurality of messaging protocols and serialization formats supported by the service, for the second service to determine the efficient messaging to the service, wherein the providing is via a directory service which advertises the messaging protocols and the serialization formats supported by the service; and
    communicating with the second service via a selected messaging protocol and a selected serialization format based on the providing, wherein the selected messaging protocol and the selected serialization format are selected automatically by the second service based on a plurality of architecture endianness, processor word width, processor location where the service and the second service are each executed, and capabilities of the service and the second service for support of corresponding messaging protocols and serialization formats, and wherein the selected messaging protocol and the selected serialization format are automatically selected by the second service to reduce processing.

2. The computer-implemented method of claim 1, wherein each of the service and the second service is a self-contained unit of functionality that is combined with other services to provide functionality of a large software application.

3. The computer-implemented method of claim 1, wherein second service selects the selected messaging protocol and the selected serialization format which requires a minimum amount of processing.

4. The computer-implemented method of claim 1, wherein directory service comprises an identification of a processor, a process, and thread the service is running on.

5. The computer-implemented method of claim 1, wherein the service and the second service exist as threads in a same process, and wherein the communicating is via function based calls using shared memory thereby avoiding serialization and marshaling.

6. The computer-implemented method of claim 1, wherein the service and the second service exist as one of separate processes and on separate processors, and wherein the communicating is based on endianness and word width.

7. An apparatus adapted to operate a service and to provide selection of efficient messaging between the service and a second service, the apparatus comprising:
    one or more processors; and
    memory storing instructions that, when executed, cause the one or more processors to
        operate the service in a one of a Microservices Architecture (MSA) and a Service-Oriented Architecture (SOA),
        provide a plurality of messaging protocols and serialization formats supported by the service for the second service to determine the efficient messaging to the service, wherein the second service is configured to determine a selected messaging protocol and a selected serialization format based on advertisements from a directory service, communicate with the second service via a selected messaging protocol and a selected serialization format based on the providing, wherein the selected messaging protocol and the selected serialization format are selected automatically by the second service based on a plurality of architecture endianness, processor word width, processor location where the service and the second service are each executed, and capabilities of the service and the second service for support of corresponding messaging protocols and serialization formats, and wherein the selected messaging protocol and the selected serialization format are automatically selected by the second service to reduce processing.

8. The apparatus of claim 7, wherein each of the service and the second service is a self-contained unit of functionality that is combined with other services to provide functionality of a large software application.

9. The apparatus of claim 7, wherein the service and second service exist as threads in a same process, and wherein communication is via function based calls using shared memory thereby avoiding serialization and marshaling.

10. The apparatus of claim 7, wherein the service and second service exist as one of separate processes and on separate processors, and wherein the communicating is based on endianness and word width.

11. The apparatus of claim 7, wherein, to provide the serialization formats, the memory storing instructions that, when executed, cause the one or more processors to provide data over two or more serialization formats from the service to the second service to determine compatibility in parallel with the second service selecting the efficient messaging based on the compatibility.

12. A system of a plurality of services which select efficient messaging between one another, the system comprising:

a plurality of services, executed on one or more servers, in a one of a Microservices Architecture (MSA) and a Service-Oriented Architecture (SOA); and a directory server communicatively coupled to the one or more servers and operating a directory service adapted to advertise a plurality of messaging protocols and serialization formats supported by a first service for a second service to automatically determine the efficient messaging to the first service, wherein the second service is configured to communicate via a selected messaging protocol and a selected serialization format based on advertisements from the directory service, wherein the second service automatically selects the selected messaging protocol and the selected serialization format based on architecture endianness, processor word width, processor location where the first service and the second service are each executed, and capabilities of the first service and the second service for support of corresponding messaging protocols and serialization formats, wherein the selected messaging protocol and the selected serialization format are automatically selected by the second service to reduce processing.

13. The system of claim 12, wherein each of the plurality of services is a self-contained unit of functionality that is combined with other services to provide functionality of a large software application.

14. The method of claim 1, wherein the serialization formats are any of JavaScript Object Notation (JSON), Extensible Markup Language (XML), Protocol Buffers (Protobuf), FlatBuffers, Thrift, YAML, External Data Representation (XDR), Flat memory space, D-Bus, and Binary JSON (BSON).

15. The method of claim 1, wherein the service and the second service are any of synchronous (blocking) function calls between functions, asynchronous (non-blocking) function calls between functions, message based between threads in a same process, message based between processes in a same processor, message based between processors sharing a same architecture, and message based between processors with different architectures.

16. The apparatus of claim 7, wherein the serialization formats are any of JavaScript Object Notation (JSON), Extensible Markup Language (XML), Protocol Buffers (Protobuf), FlatBuffers, Thrift, YAML, External Data Representation (XDR), Flat memory space, D-Bus, and Binary JSON (BSON).

17. The apparatus of claim 7, wherein the service and the second service are any of synchronous (blocking) function calls between functions, asynchronous (non-blocking) function calls between functions, message based between threads in a same process, message based between processes in a same processor, message based between processors sharing a same architecture, and message based between processors with different architectures.

18. The system of claim 12, wherein the serialization formats are any of JavaScript Object Notation (JSON), Extensible Markup Language (XML), Protocol Buffers (Protobuf), FlatBuffers, Thrift, YAML, External Data Representation (XDR), Flat memory space, D-Bus, and Binary JSON (BSON).

19. The system of claim 12, wherein the service and the second service are any of synchronous (blocking) function calls between functions, asynchronous (non-blocking) function calls between functions, message based between threads in a same process, message based between processes in a same processor, message based between processors sharing a same architecture, and message based between processors with different architectures.

* * * * *